(12) United States Patent  
Nakagawa et al.

(10) Patent No.: US 7,360,826 B2
(45) Date of Patent: Apr. 22, 2008

(54) SHEET MEMBER WITH FRAME BODY

(75) Inventors: Masafumi Nakagawa, Tokyo (JP); Seiji Katakura, Tokyo (JP); Masatoshi Nishida, Tokyo (JP); Shigehito Horiuchi, Tochigi (JP); Hajime Katayama, Tochigi (JP); Kuniyasu Aoki, Tochigi (JP); Koichi Hotta, Tochigi (JP)

(73) Assignees: Nippon Sheet Glass Company, Limited, Tokyo (JP); Yachiyo Kogyo Kabushiki Kaisha, Sayama-shi (JP)

( * ) Notice: Subject to any disclaimer, the term of this patent is extended or adjusted under 35 U.S.C. 154(b) by 16 days.

(21) Appl. No.: 11/440,051

(22) Filed: May 25, 2006

(65) Prior Publication Data

US 2006/0279110 A1 Dec. 14, 2006

(30) Foreign Application Priority Data

May 27, 2005 (JP) ............................. 2005-155556

(51) Int. Cl.
*B60J 10/12* (2006.01)

(52) U.S. Cl. ............................. 296/216.09; 296/216.06; 49/489.1

(58) Field of Classification Search ........... 296/216.06, 296/216.09; 49/489.1, 498.1
See application file for complete search history.

(56) References Cited

U.S. PATENT DOCUMENTS 6,286,898 B1 * 9/2001 Mori et al. ............. 296/216.09
2002/0002804 A1 * 1/2002 Sheehy ........................ 52/272

FOREIGN PATENT DOCUMENTS

JP 2005-8048 1/2005

* cited by examiner

*Primary Examiner*—Dennis H Pedder
(74) *Attorney, Agent, or Firm*—Kratz, Quintos & Hanson, LLP

(57) ABSTRACT

A sheet member with a frame body in the present invention has the sheet member and the frame body composed of a resin material attached to a fringe of the sheet member, wherein the frame body opens in an outward direction parallel with a sheet face of the sheet member and in the frame body a fit-in groove is formed to fit in a fit-in object, and wherein the fit-in groove is formed so as to have an overlap space with the sheet member in a direction parallel with the sheet face of the sheet member.

20 Claims, 3 Drawing Sheets

SHEET MEMBER WITH FRAME BODY

BACKGROUND OF THE INVENTION

1. Field of the Invention

The present invention relates to a sheet member with a frame body applied to such a roof panel of a vehicle sunroof apparatus.

2. Description of the Related Art

In a vehicle sunroof apparatus, at a fringe of a roof panel (for example, a glass panel) of a sheet member is usually attached a weatherstrip for sealing a gap between the roof panel and a fixed roof, and an example of its attachment structure is described in Japanese Patent Laid-Open Publication No. 2005-8048 (FIG. 1). FIG. 5 shows the structure shown in FIG. 1 of the Publication No. 2005-8048. At a fringe of a roof panel 31 is attached a frame body 32, which consists of a resin material, by outsert molding. In the frame body 32 is formed a fit-in groove 33 opening in an outward direction parallel with a sheet face of the roof panel 31, and by fitting an engaging stopper portion 35 of a weatherstrip 34 in the groove 33, the strip 34 is attached to the panel 31.

FIG. 6 shows a condition when a metal mold 36 for the fit-in groove 33 is pulled out just after molding of the frame body 32 in outsert molding. When pulling out the metal mold 36 in an arrow mark direction, the frame body 32 also results in being pulled in the arrow mark direction because of a generation of a friction force between the mold 36 and an inner wall of the fit-in groove 33; Therefore, there exists a problem that an unreasonable force tends to be applied to an interface between an end face 31a of the roof panel 31 and the frame body 32 because conventionally a formed position of the fit-in groove 33 exists more outside (right in FIG. 6) than the face 31a and a tension acting point results in being positioned more outside than the face 31a. In addition, also in such a case of changing the weatherstrip 34, because a friction force is generated between an engaging stopper portion 35 and the inner wall of the fit-in groove 33, the tension acting point results in being positioned more outside than the end face 31a of the roof panel 31, an unreasonable force tends to be applied to the interface between the face 31a and the frame body 32.

Consequently, a sheet member with a frame body is strongly requested that reduces a force added to an interface between an end face of the sheet member and the frame body in such as pulling out a fit-in object.

SUMMARY OF THE INVENTION

In order to solve the problem, the present invention is a sheet member with a frame body comprising the sheet member and the frame body composed of a resin material attached to a fringe of the sheet member, wherein the frame body opens in an outward direction parallel with a sheet face of the sheet member and in the frame body a fit-in groove is formed to fit in a fit-in object, and wherein the fit-in groove is formed so as to have an overlap space with the sheet member in a direction parallel with the sheet face of the sheet member.

In accordance with the sheet member with the frame body, in a case that the frame body is attached to the sheet member by outsert molding, because the fit-in groove is formed so as to have an overlap space with the sheet member in a direction parallel with the sheet face of the sheet member, a tension acting point generated in the frame body is positioned further inside the sheet member, compared to the point in a frame body of a conventional sheet member, when pulling out a metal mold for the fit-in groove just after molding of the frame body in outsert molding. Thus it is enabled to concentrate a tension on an interface between the sheet face of the sheet member and the frame body to reduce a force applied to an interface between the frame body and the end face of the sheet member. In addition, also in pulling out a fit-in object from a fit-in groove such as changing the object, the tension acting point results in being positioned further inside the sheet member compared to the point in a frame body of a conventional sheet member, it is enabled to reduce the force applied to the interface between the frame body and the end face of the sheet member.

In addition, in a sheet member with a frame body in the present invention, a size of the overlap space is not less than 30% of a depth size of the fit-in groove.

In accordance with the sheet member with the frame body, it is enabled to make a tension acting point positioned further inside the sheet member and to further reduce a force applied to an interface between the frame body and the end face of the sheet member.

In addition, in a sheet member with a frame body in the present invention, an opening of the fit-in groove is formed narrower than an inside of the fit-in groove by a pair of engaging stopper protrusions, and ends of the engaging stopper protrusions facing a back (center side of the sheet member) of the fit-in groove is positioned more inside than the end face of the sheet member in a direction parallel with a sheet face of the sheet member.

In accordance with the sheet member with frame body, because each end position of the engaging stopper protrusions becoming a larger resistance in pulling out a metal mold becomes more inside in the sheet member than the end face thereof, it is enabled to further reduce a force applied to an interface between the frame body and the end face of the sheet member.

In addition, in a sheet member with a frame body in the present invention, the frame body is composed of a material selected from any one of PVC (Polyvinyl Chloride compound), TPS (Thermoplastic styrenic elastomer), TPO (Thermoplastic Polyolefin elastomer), TPEE (Thermoplastic Polyether Elastomer), and TPU (Thermoplastic Polyurethane elastomer).

In accordance with the sheet member with the frame body, because any one of the PVC, the TPS, the TPO, the TPEE, and the TPU is a resin material excellent in outsert molding and versatility, it becomes the sheet member with the frame body excellent in a quality and economical efficiency of the frame body.

In addition, in a sheet member with a frame body in the present invention, the sheet member is a roof panel of an open/close system in a vehicle sunroof apparatus and comprises a weatherstrip having a seal portion for elastically contacting a fixed vehicle roof and an engaging stopper portion for fitting in the fit-in groove.

In accordance with the sheet member with the frame body, it is enabled to provide the vehicle sunroof apparatus excellent in a connection strength between the roof panel and the weatherstrip.

BEST MODE FOR CARRYING OUT THE INVENTION

Figure 1:
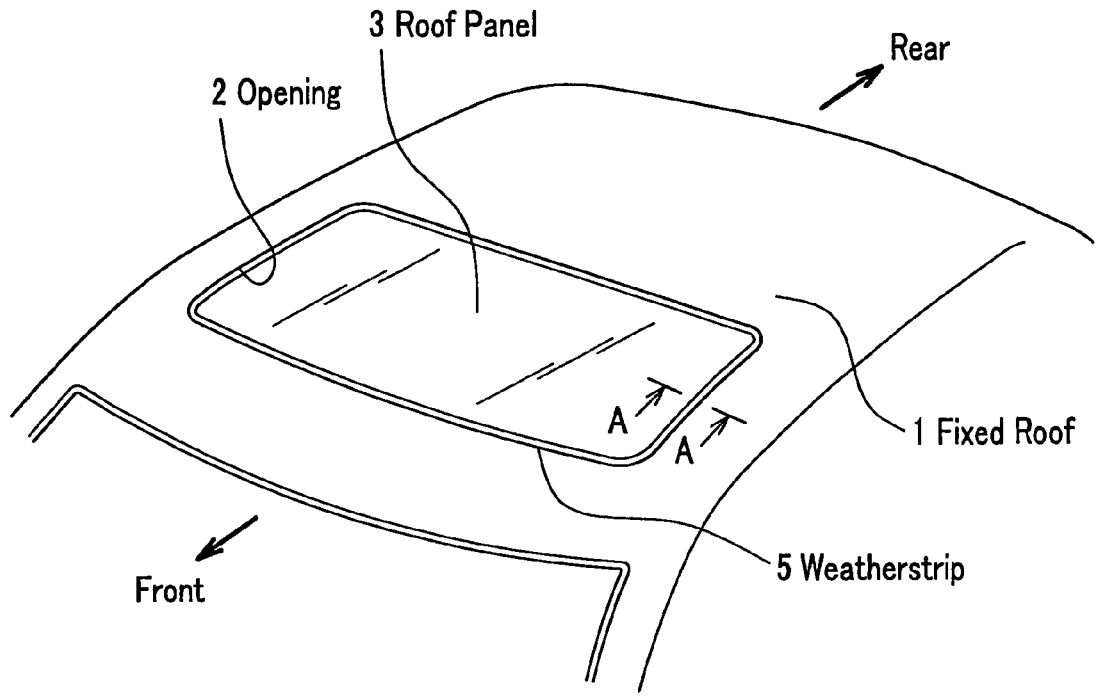
FIG. 1 is an appearance perspective view of a sunroof apparatus.

Hereinafter will be described a case that a sheet member is assumed a roof panel in a vehicle sunroof apparatus. FIG. 1 is an appearance perspective view of the sunroof apparatus, and it comprises a roof panel 3 that closes a rectangular opening 2 formed in a fixed roof when closed, of which a rear end tilts up or down when opened, and that then moves rearward. In an embodiment of the present invention the roof panel 3 is made of glass.

Figure 2:
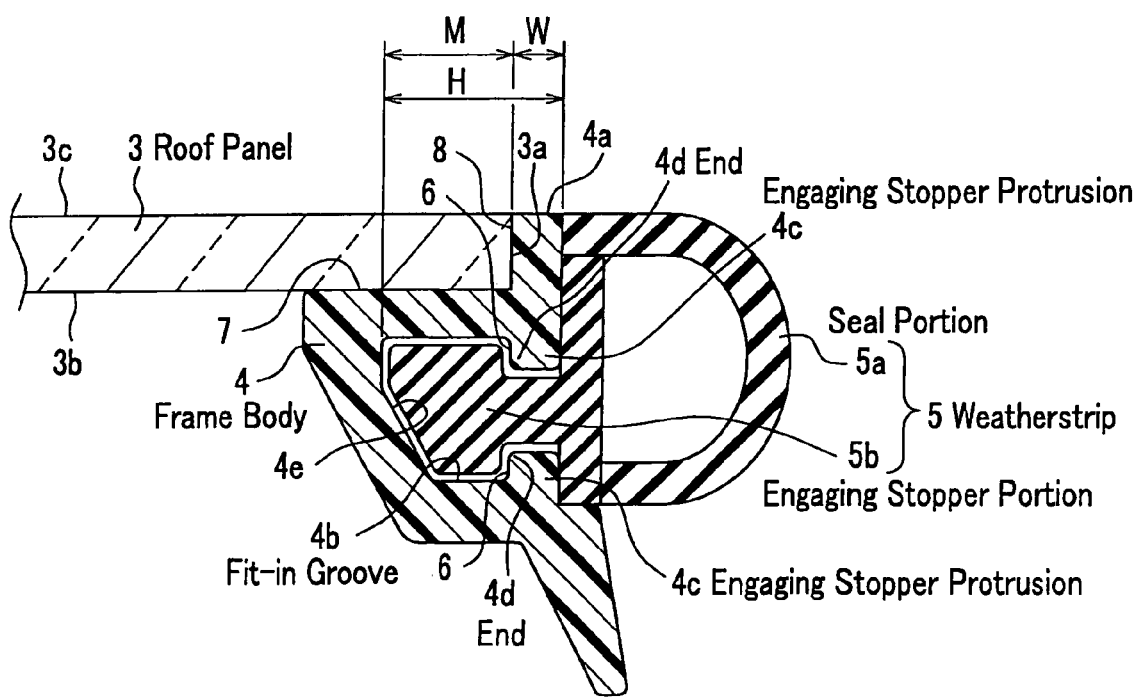
FIG. 2 is a section illustration drawing of a sheet member with a frame body related to the present invention, and an A-A section view in FIG. 1.

FIG. 2 is an A-A section view in FIG. 1. At a fringe of the roof panel 3 is integrally provided a frame body 4 composed of a resin material by outsert molding. To be more precise, the frame body 4 is adhered to a whole face of an end face 3a of the roof panel 3 and around a lower face 3b of the panel 3, and an upper face 4a of the frame body 4 and an upper face 3c of the panel 3 are formed to be a same face (flush surface). As outsert molding can be cited an injection molding method, an extrusion molding method, and the like.

The roof panel 3 and the frame body 4 are mutually adhered at an interface thereof through an adhesive (here, a primer). In the embodiment, although if the adhesive can adhere a glass material and a resin material well, it is not specifically limited; as a preferable example, in a case that a material of the frame body 4 is the TPS, the glass material and an olefin adhesive excellent in adhesive force to the TPS can be used.

In the frame body 4, below the roof panel 3 is formed a fit-in groove 4b opening in an outward direction (right direction in FIG. 2) parallel with a sheet face of the roof panel 3. In FIG. 2, although a taper face 4e is formed at a back (center side of the roof panel 3) of the fit-in groove 4b, an inner shape of the fit-in groove 4b is not specifically limited in the present invention. In the fit-in groove 4b is fitted a weatherstrip 5 of a fit-in object. The weatherstrip 5 is a member having a seal portion 5a for elastically contacting the fixed roof 1 (FIG. 1) and an engaging stopper portion 5b for fitting in the fit-in groove 4b. Although the seal portion 5a and the engaging stopper portion 5b may be a same material, usually the portion 5a is composed of a soft synthetic rubber material and the engaging stopper portion 5b is composed of a material harder than the portion 5a; in this case both are integrally formed, for example, by two-color molding.

Figure 3:
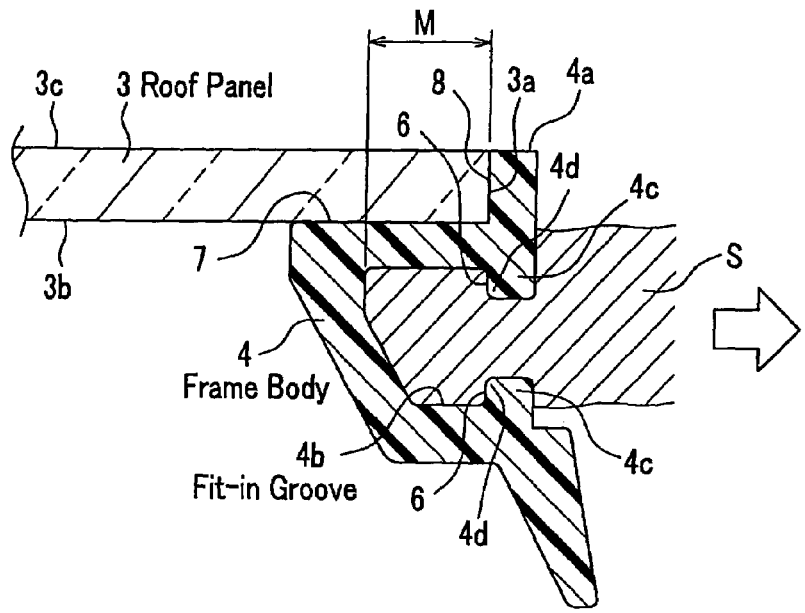
FIG. 3 is a section illustration drawing in pulling out a metal mold for a fit-in groove just after molding of the frame body shown in FIG. 2.

In a structure thus described, the present invention is mainly characterized in that the fit-in groove 4b is configured so as to have an overlap space M in a direction parallel with the sheet face of the roof panel 3 as shown in a side section view in FIG. 2. FIG. 3 shows a condition of pulling out a metal mold S for the fit-in groove 4b just after molding of the frame body 4 in outsert molding. When pulling out the metal mold S in an arrow mark direction, because a friction force is generated between the mold S and an inner wall of the fit-in groove 4b, the frame body 4 also results in being pulled in the arrow mark direction. Particularly, in a case that an opening of the fit-in groove 4b is formed narrower than an inside thereof by a pair of engaging stopper protrusions 4c, because step portions 6 result in being formed between the metal mold S and the protrusions 4c, the step portions 6 are resistant in pulling out the mold S and the frame body 4 tends to be further pulled in the arrow mark direction.

Figure 6:
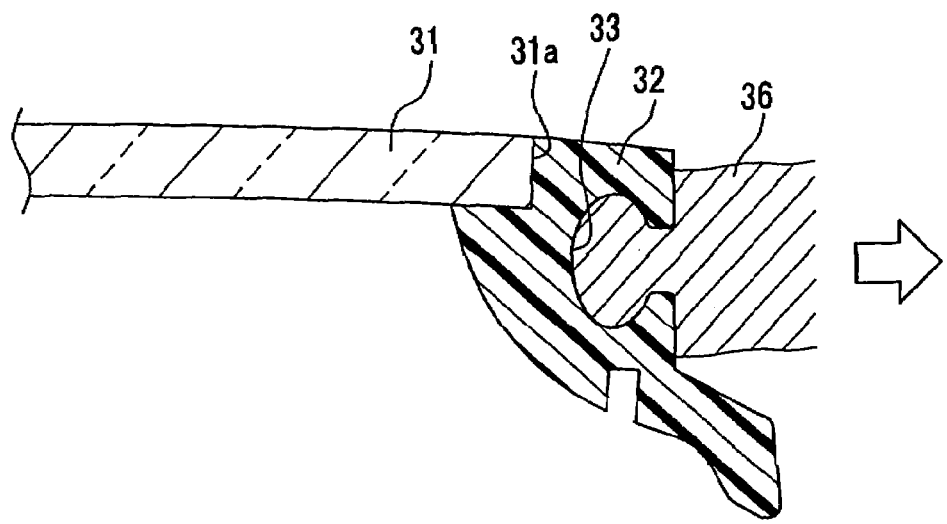
FIG. 6 is a section illustration drawing in pulling out a metal mold for a fit-in groove just after molding of a frame body shown in FIG. 5.

Meanwhile, as described in FIG. 6, because conventionally the formed position of the fit-in groove 33 exists more outside than the end face 31a and the tension acting point results in being positioned more outside than the face 31a, the unreasonable force tends to be applied to the interface between the face 31a and the frame body 32; whereas in FIG. 3 in the present invention, because the fit-in groove 4b is formed so as to have the overlap space M with respect to the roof panel 3, thereby the tension acting point is positioned more inside (center side of the roof panel 3, meaning left in FIG. 3) than the conventional point. In other words, because the tension acting point results in being adjacent to an interface 7 between the lower face 3b of the roof panel 3 and the frame body 4, a tension generated in the body 4 acts largely on the interface 7 than a conventionally generated tension, and thereby it becomes difficult for an unreasonable force to be applied to an interface 8 between the end face 3a of the roof panel 3 and the body 4. Meanwhile, because a tension mainly acts as a shearing force on the interface 7, it is difficult for a separation of the frame body 4 to be generated therein.

In addition, in FIG. 2, although also in pulling out the weatherstrip 5 such as changing the strip 5, a friction force is generated between the engaging stopper portion 5b and the inner wall of the fit-in groove 4b, and the frame body 4 is pulled (although FIG. 2 is shown as if there exists a gap between the engaging stopper portion 5b and the inner wall of the fit-in groove 4b, they are actually in contact with each other by face), it becomes difficult for an unreasonable force to be applied to the interface 8 between the end face 3a of the roof panel 3 and the body 4 thanks to a similar action in pulling out the metal mold S.

Figure 4:
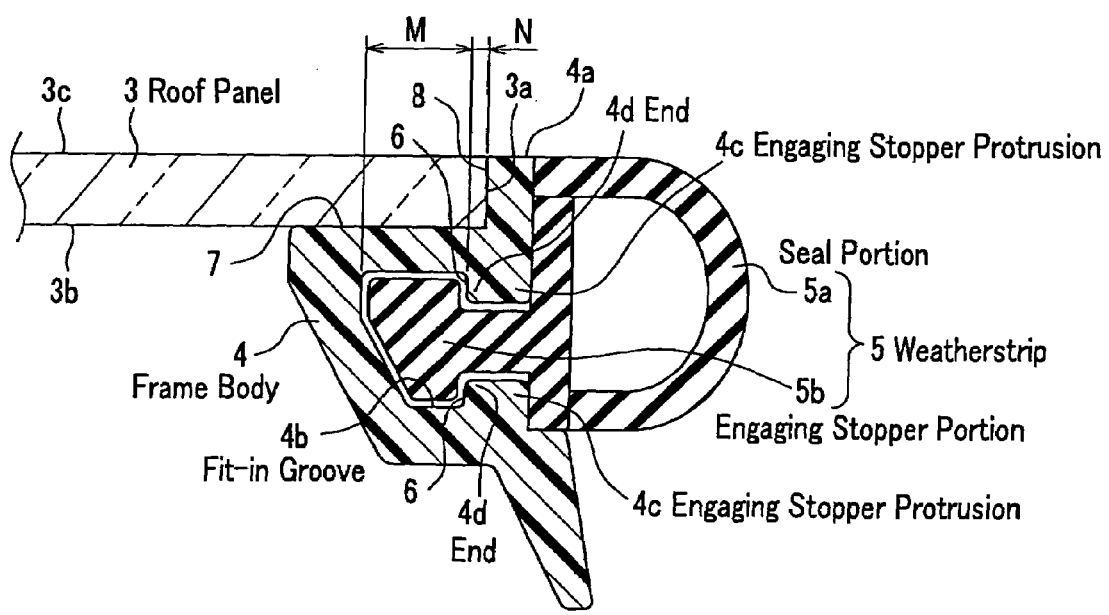
FIG. 4 is a section illustration drawing showing a variation example for FIG. 2.
Figure 5:
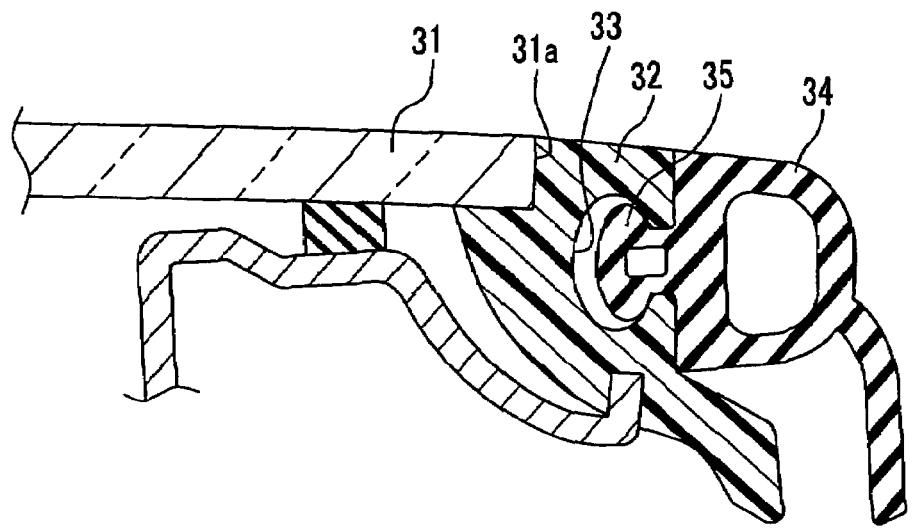
FIG. 5 is a section illustration drawing of a conventional roof panel.

FIG. 4 shows a variation example for FIG. 2, and a case that ends 4d of the engaging stopper protrusions 4c facing the back of the fit-in groove 4b are positioned more inside (center side of the roof panel 3, meaning left in FIG. 3; its distance is shown by symbol N) than the end face 3a of the roof panel 3 in a direction parallel with the sheet face of the panel 3. In accordance with the layout configuration, because generation positions (namely, positions of step portions 6) of a larger resistance become more inside in the roof panel 3 than the end face 3a thereof, an unreasonable force applied to the interface 8 results in being reduced more than the case in FIG. 2. Also in pulling out the weatherstrip 5 such as changing the strip 5, a similar effect can be obtained.

Next, in FIG. 2 it is preferable that a size of a depth H of the fit-in groove 4b is around 6 to 15 mm; in a case of not less than 6 mm an engaging stopper strength of the weatherstrip 5 (engaging stopper portion 5b) is advantageous; and in a case of not more than 15 mm a downsizing of the frame body 4 is advantageous. In addition, with respect to the size of the overlap space M, the larger a ratio to the size of the depth H is, the more preferable the size of the overlap space M is, because the tension acting point is positioned further inside the roof panel 3; for example, the size of the overlap space M is preferably not less than 30% of the size of the depth H.

In addition, in accordance with the present invention, in a case of assuming the size of the depth H of the fit-in groove 4b to be a constant value, a configuration of providing the overlap space M results in bringing an effect that a size of a width W of the upper face 4a can be made smaller in the frame body 4. If only the frame body 4 has a function of surely connecting the roof panel 3 and the weatherstrip 5, the body 4 is a better member if an exposed region of the body 4 is small as much as possible. In accordance with the present invention it is enabled to make it around 2 to 5 mm the size of the width W of the upper face 4a of an exposure face, thereby an exposure area becomes smaller, and becomes an advantageous structure with respect to a problem specific to a resin material said to be easily damaged.

Thus the best mode of the present invention has been described. As a sheet member can be applied a hard resin such as an acryl resin and a polycarbonate resin, a steel sheet, and the like other than glass. In addition, as a material of the frame body 4 can be used the TPS, the TPO, the TPEE, the TPU, the PVC, TPA (Thermoplastic Polyamide elastomer), a fluorine rubber, and the like. However, from points that there exists less load for an environment, an anti-damage property is excellent, and adhesiveness to glass is excellent, in a case that the sheet member is glass, the TPS and the TPO are preferable as the material of the frame body 4; considering a fluidity at a higher temperature in molding, the TPS can be said to be the most favorable material.

What is claimed is:

1. A sheet member with a frame body comprising:
   the sheet member and;
   the frame body composed of a resin material attached to a fringe of the sheet member, the frame body adhered to a whole surface of an end face of the sheet member and a lower sheet face of the sheet member,
   wherein the frame body opens in an outward direction parallel with the lower sheet face of the sheet member, and in the frame body a fit-in groove is formed to fit in a fit-in object, and
   wherein the fit-in groove is formed so as to have an overlap space with the sheet member in a direction parallel with the lower sheet face of the sheet member.

2. The sheet member with the frame body according to claim 1, wherein a size of the overlap space is not less than 30% of a depth size of the fit-in groove.

3. A sheet member with a frame body comprising:
   the sheet member and;
   the frame body composed of a resin material attached to a fringe of the sheet member, the frame body adhered to a whole surface of an end face of the sheet member and a lower sheet face of the sheet member,
   wherein the frame body opens in an outward direction parallel with the lower sheet face of the sheet member, and in the frame body a fit-in groove is formed to fit in a fit-in object,
   wherein the fit-in groove is formed so as to have an overlap space with the sheet member in a direction parallel with the lower sheet face of the sheet member, and
   wherein an opening of the fit-in groove is formed narrower than an inside of the fit-in groove by a pair of engaging stopper protrusions, and wherein ends of the engaging stopper protrusions facing a back of the fit-in groove are positioned more inside than an end face of the sheet member in a direction parallel with the lower sheet face of the sheet member.

4. The sheet member with the frame body according to claim 3, wherein a size of the overlap space is not less than 30% of a depth size of the fit-in groove.

5. The sheet member with the frame body according to claim 1, wherein the frame body is composed of a material selected from any one of a polyvinyl chloride compound, a thermoplastic styrenic elastomer, a thermoplastic polyolefin elastomer, a thermoplastic polyether elastomer, and a thermoplastic polyurethane elastomer.

6. The sheet member with the frame body according to claim 2, wherein the frame body is composed of a material selected from any one of a polyvinyl chloride compound, a thermoplastic styrenic elastomer, a thermoplastic polyolefin elastomer, a thermoplastic polyether elastomer, and a thermoplastic polyurethane elastomer.

7. The sheet member with the frame body according to claim 3, wherein the frame body is composed of a material selected from any one of a polyvinyl chloride compound, a thermoplastic styrenic elastomer, a thermoplastic polyolefin elastomer, a thermoplastic polyether elastomer, and a thermoplastic polyurethane elastomer.

8. The sheet member with the frame body according to claim 4, wherein the frame body is composed of a material selected from any one of a polyvinyl chloride compound, a thermoplastic styrenic elastomer, a thermoplastic polyolefin elastomer, a thermoplastic polyether elastomer, and a thermoplastic polyurethane elastomer.

9. The sheet member with the frame body according to claim 1, wherein the sheet member is a roof panel for an open/close system in a vehicle sunroof apparatus and comprises a weatherstrip having a seal portion configured to elastically contact a fixed vehicle roof and an engaging stopper portion configured to fit in the fit-in groove.

10. The sheet member with the frame body according to claim 2, wherein the sheet member is a roof panel for an open/close system in a vehicle sunroof apparatus and comprises a weatherstrip having a seal portion configured to elastically contact a fixed vehicle roof and an engaging stopper portion configured to fit in the fit-in groove.

11. The sheet member with the frame body according to claim 3, wherein the sheet member is a roof panel for an open/close system in a vehicle sunroof apparatus and comprises a weatherstrip having a seal portion configured to elastically contact a fixed vehicle roof and an engaging stopper portion configured to fit in the fit-in groove.

12. The sheet member with the frame body according to claim 4, wherein the sheet member is a roof panel for an open/close system in a vehicle sunroof apparatus and comprises a weatherstrip having a seal portion configured to elastically contact a fixed vehicle roof and an engaging stopper portion configured to fit in the fit-in groove.

13. The sheet member with the frame body according to claim 5, wherein the sheet member is a roof panel for an open/close system in a vehicle sunroof apparatus and comprises a weatherstrip having a seal portion configured to elastically contact a fixed vehicle roof and an engaging stopper portion configured to fit in the fit-in groove.

14. The sheet member with the frame body according to claim 6, wherein the sheet member is a roof panel for an open/close system in a vehicle sunroof apparatus and comprises a weatherstrip having a seal portion configured to elastically contact a fixed vehicle roof and an engaging stopper portion configured to fit in the fit-in groove.

15. The sheet member with the frame body according to claim 7, wherein the sheet member is a roof panel for an open/close system in a vehicle sunroof apparatus and comprises a weatherstrip having a seal portion configured to elastically contact a fixed vehicle roof and an engaging stopper portion configured to fit in the fit-in groove.

16. The sheet member with the frame body according to claim 8, wherein the sheet member is a roof panel for an open/close system in a vehicle sunroof apparatus and comprises a weatherstrip having a seal portion configured to elastically contact a fixed vehicle roof and an engaging stopper portion configured to fit in the fit-in groove.

17. The sheet member with the frame body according to claim 1, wherein the sheet member is made of any one of glass, a hard resin, and a steel sheet.

18. The sheet member with the frame body according to claim 2, wherein the sheet member is made of any one of glass, a hard resin, and a steel sheet.

19. The sheet member with the frame body according to claim 3, wherein the sheet member is made of any one of glass, a hard resin, and a steel sheet.

20. The sheet member with the frame body according to claim 4, wherein the sheet member is made of any one of glass, a hard resin, and a steel sheet.

* * * * *